United States Patent
Neumann et al.

(10) Patent No.: US 9,333,972 B2
(45) Date of Patent: May 10, 2016

(54) METHOD AND SYSTEM FOR EXITING A SAILING MODE OF A VEHICLE

(71) Applicant: Bayerische Motoren Werke Aktiengesellschaft, Munich (DE)

(72) Inventors: Lutz Neumann, Neufahrn (DE); Sebastian Thein, Munich (DE); Markus Nell, Munich (DE); Robert Schirnhofer, Munich (DE); Tobias Soller, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/498,020

(22) Filed: Sep. 26, 2014

(65) Prior Publication Data

US 2016/0090093 A1    Mar. 31, 2016

(51) Int. Cl.
*B60R 22/00* (2006.01)
*B60W 30/18* (2012.01)
*B60W 10/06* (2006.01)
*B60W 10/02* (2006.01)
*B60R 1/00* (2006.01)
*G06K 9/00* (2006.01)
*B60W 20/00* (2016.01)
*B60W 10/08* (2006.01)
*B60W 30/20* (2006.01)

(52) U.S. Cl.
CPC ............ *B60W 30/18072* (2013.01); *B60R 1/00* (2013.01); *B60W 10/02* (2013.01); *B60W 10/06* (2013.01); *G06K 9/00832* (2013.01); *B60W 10/08* (2013.01); *B60W 20/00* (2013.01); *B60W 2030/1809* (2013.01); *B60W 2030/206* (2013.01)

(58) Field of Classification Search
CPC ..... B60W 10/02; B60W 10/06; B60W 10/08; B60W 20/108; B60W 20/40; B60W 2030/206; B60W 2030/1809; B60W 30/18072; B60W 20/00; B60H 1/26; B60R 1/00; B06K 9/00832
See application file for complete search history.

(56) References Cited

U.S. PATENT DOCUMENTS

| | | | | |
|---|---|---|---|---|
| 4,462,303 A | * | 7/1984 | Gebhard | B60H 1/248 454/134 |
| 8,808,140 B2 | * | 8/2014 | Reed | B60W 10/02 477/5 |
| 9,005,075 B2 | * | 4/2015 | Reed | B60W 10/02 477/3 |
| 2013/0296119 A1 | * | 11/2013 | Reed | B60W 10/02 477/5 |
| 2013/0296120 A1 | * | 11/2013 | Reed | B60W 10/025 477/5 |

(Continued)

*Primary Examiner* — Behrang Badii
(74) *Attorney, Agent, or Firm* — Crowell & Moring LLP

(57) ABSTRACT

A method (600) for exiting a sailing mode of a vehicle (100) is described. The vehicle (100) comprises a clutch unit (103) which is disengaged in order to decouple a driving shaft (102) of the vehicle (100) from a driven shaft (105) of the vehicle (100), when the vehicle (100) is operated in the sailing mode. The method (600) comprises predicting (601) that a trigger for an exit of the sailing mode will occur, and initiating (602) the preparation of the clutch unit (103) for engagement, subject to predicting that a trigger for the exit of the sailing mode will occur. Furthermore, the method (600) comprises detecting (603) a trigger for the exit of the sailing mode, and adapting (604) a shaft speed (230) of the driving shaft (102), subject to detecting a trigger for the exit of the sailing mode. In addition, the method (600) comprises engaging (605) the clutch unit (103), subject to preparing the clutch unit (103) for engagement and subject to adapting the shaft speed (130), in order to exit the sailing mode.

14 Claims, 5 Drawing Sheets

(56) References Cited

U.S. PATENT DOCUMENTS

Figure 1:
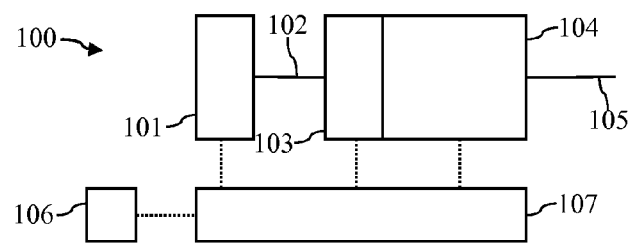

2014/0323267 A1* 10/2014 Reed .................... B60W 10/02 477/5

2015/0251651 A1* 9/2015 Reed .................... B60W 10/02 477/5

2015/0329204 A1* 11/2015 Nelson .................. B64C 39/024 244/6

* cited by examiner

METHOD AND SYSTEM FOR EXITING A SAILING MODE OF A VEHICLE

TECHNICAL FIELD

The present document relates to the control of a drive unit, notably to the control of an automotive drive unit. In particular, the present document relates to the control for exiting a sailing mode, which describes the status of a power train, where torque flow is interrupted by opening at least one shift element, e.g. a clutch.

BACKGROUND

Drive units are used in vehicles (notably in automobiles) to transmit a torque generated by a combustion engine towards the wheels of the vehicle. Such drive units typically comprise a transmission with a plurality of different gears and one or more clutches or a clutch unit comprising one or more clutches for coupling or decoupling the transmission with or from the crankshaft of the combustion engine. In particular, an automatic transmission may comprise a plurality of clutches which are used for shifting between different gears and/or for shifting to the different modes N, R and D. By opening a certain number of the plurality of clutches, the torque flow between an input and an output of the automatic transmission, i.e. between a driving shaft and a driven shaft of the vehicle, may be interrupted.

In order to allow for an increased efficiency, a vehicle may be operated in a so called sailing mode, during which the vehicle cruises with the combustion engine being decoupled from the output shaft and/or wheels, i.e. with at least one clutch or clutch unit being disengaged. In case of semi-automatic or automatic transmissions, the clutch may be disengaged automatically when one or more conditions for entering the sailing mode are met. On the other hand, the clutch may be engaged automatically, when one or more conditions for leaving or exiting the sailing mode are met.

Entering and notably exiting the sailing mode should be performed in a manner which remains substantially unnoticed by a driver of the vehicle. The present document describes methods and systems which enable a vehicle to automatically exit a sailing mode, wherein the methods and systems reduce noticeable impacts on the driving experience of a driver of a vehicle, such as a delay of acceleration after actuation of a throttle pedal when coming from the sailing mode compared to when coming from normal driving without sailing.

SUMMARY

According to an aspect, a method for exiting a sailing mode of a vehicle is described. The vehicle comprises a clutch unit which is disengaged when the vehicle is operated in the sailing mode, in order to decouple a driving shaft of the vehicle from an output shaft (also referred to as a driven shaft) and/or from wheels of the vehicle. In particular, a torque flow from a driving shaft of a transmission to a driven shaft of the transmission may be interrupted, when the vehicle is operated in the sailing mode. The method comprises predicting that a trigger for an exit of the sailing mode will occur, and initiating the preparation of the clutch unit for engagement, subject to or upon predicting that a trigger for the exit of the sailing mode will occur. In addition, the method comprises detecting a trigger for the exit of the sailing mode, and adapting a shaft speed of the driving shaft, subject to or upon detecting a trigger for the exit of the sailing mode. Furthermore, the method may comprise engaging (e.g. engaging without slipping) the clutch unit, subject to preparing the clutch unit for engagement and subject to adapting the shaft speed, thereby concluding the exit of the sailing mode.

According to a further aspect, another method for exiting a sailing mode of a vehicle is described. The vehicle comprises a clutch unit which is disengaged when the vehicle is operated in the sailing mode, in order to decouple a driving shaft of the vehicle from a driven shaft of the vehicle. The method comprises detecting a trigger for an exit of the sailing mode, and subject to or upon detecting a trigger for the exit of the sailing mode and while preparing the clutch unit for engagement, regulating a shaft speed of the driving shaft in accordance to a target speed. In addition, the method comprises interrupting the regulation of the shaft speed prior to reaching the target speed and prior to engaging the clutch unit. Furthermore, the method comprises, subject to or upon interrupting the regulation of the shaft speed and while preparing the clutch unit for engagement, adapting a torque at the driving shaft in accordance to a torque which is transmissible by the clutch unit prior to engagement of the clutch unit.

According to a further aspect, a control unit for a vehicle is described. The vehicle comprises a clutch unit which is disengaged, when the vehicle is operated in a sailing mode, in order to decouple a driving shaft of the vehicle from an output shaft or a driven shaft of the vehicle. The control unit is configured to predict that a trigger for an exit of the sailing mode will occur, and to initiate the preparation of the clutch unit for engagement, subject to or upon predicting that a trigger for the exit of the sailing mode will occur. Furthermore, the control unit is configured to detect a trigger for the exit of the sailing mode, and to cause a shaft speed of the driving shaft to be adapted, subject to or upon detecting a trigger for the exit of the sailing mode. In addition, the control unit may be configured to cause the clutch unit to be engaged (e.g. without slipping), subject to preparing the clutch unit for engagement and subject to adapting the shaft speed, in order to conclude the exit of the sailing mode.

According to another aspect, a control unit for a vehicle is described. The vehicle comprises a clutch unit which is disengaged when the vehicle is operated in a sailing mode, in order to decouple a driving shaft of the vehicle from a driven shaft of the vehicle. The control unit is configured to detect a trigger for an exit of the sailing mode, and subject to or upon detecting a trigger for the exit of the sailing mode and while preparing the clutch unit for engagement, to regulate a shaft speed of the driving shaft in accordance to a target speed. Furthermore, the control unit is configured to interrupt the regulation of the shaft speed prior to reaching the target speed and prior to engaging the clutch unit. In addition, the control unit is configured, subject to or upon interrupting the regulation of the shaft speed and while preparing the clutch unit for engagement, to cause a torque at the driving shaft to be adapted in accordance to a torque which is transmissible by the clutch unit prior to (full) engagement of the clutch unit.

According to a further aspect, a vehicle (e.g. an automobile, a motorbike or a truck) is described which comprises a control unit described in the present document.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method (and vice versa). Furthermore, all aspects of the methods and systems outlined in the present document may be arbitrarily combined. In particular, the features of the claims may be combined with one another in an arbitrary manner.

SHORT DESCRIPTION OF THE FIGURES

Figure 4:
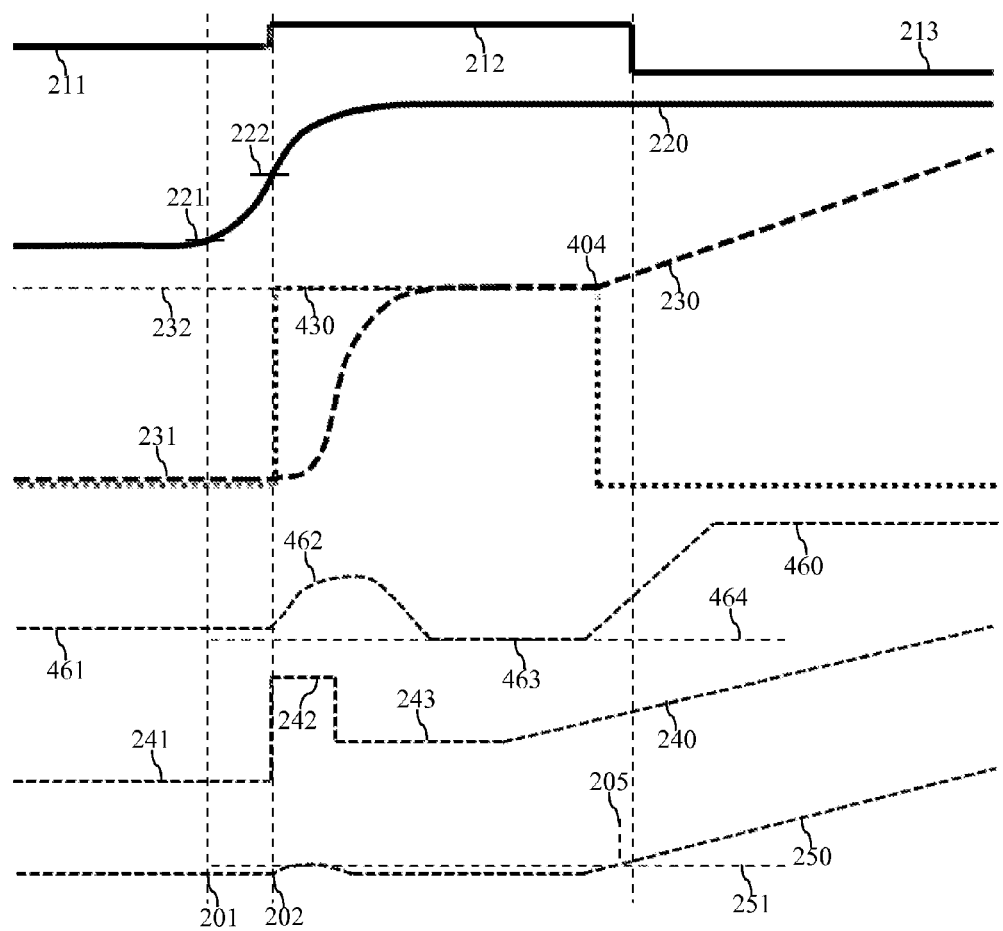
Figure 5:
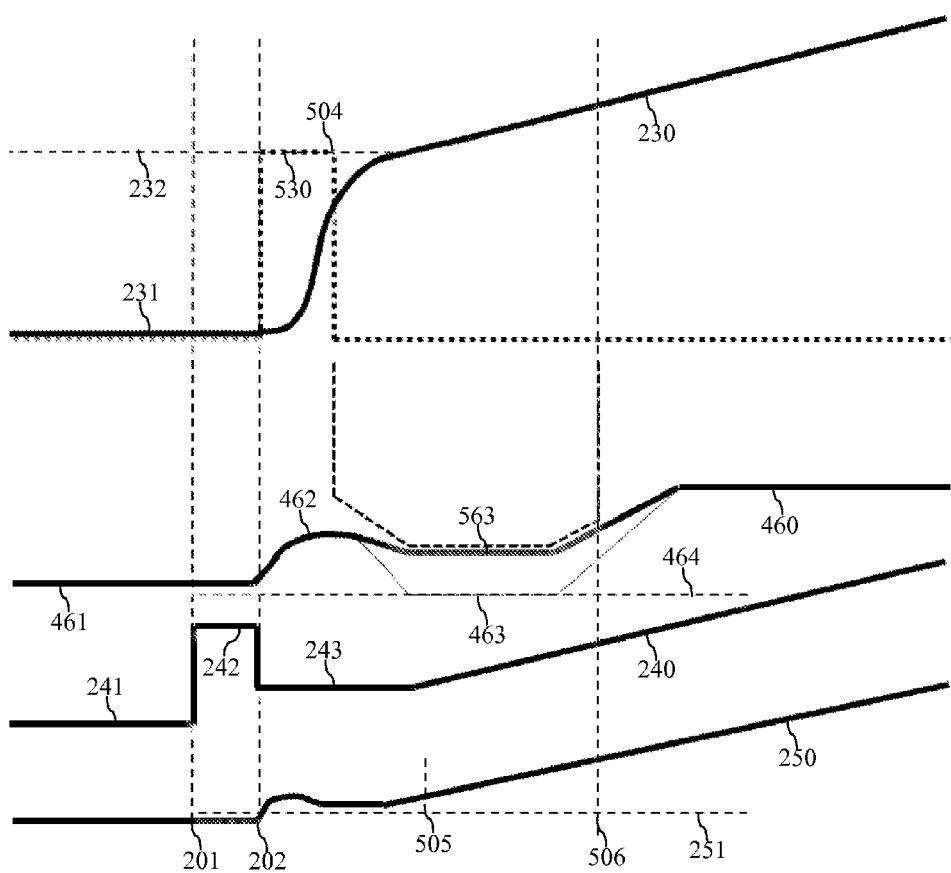
Figure 6:
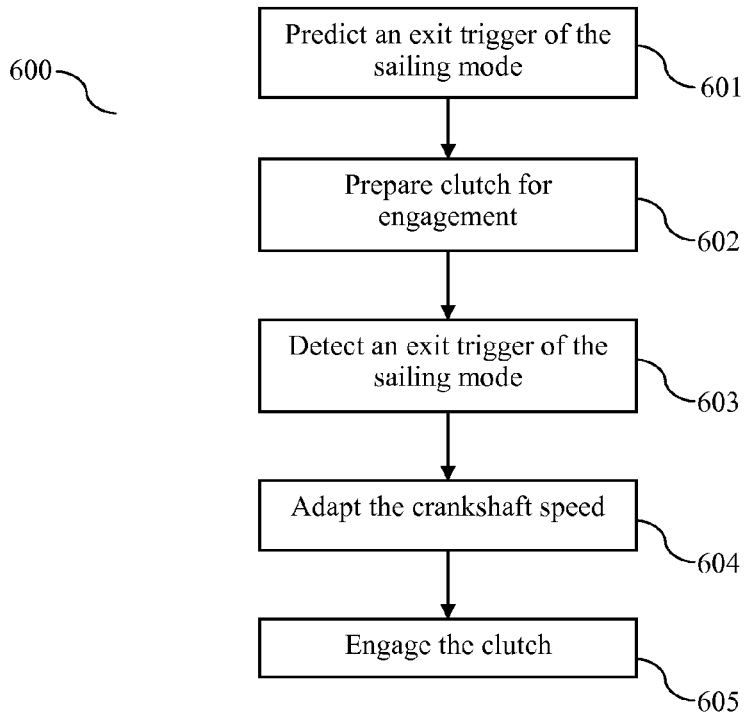
Figure 7:
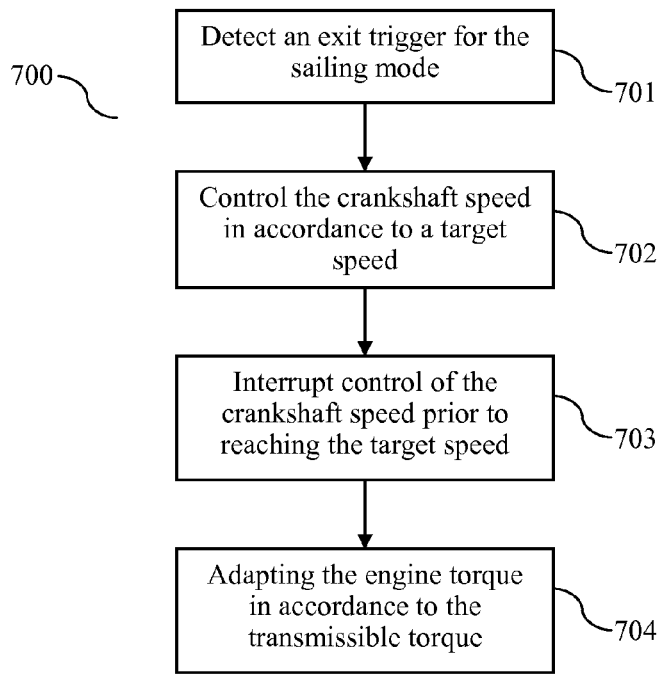

The invention is explained below in an exemplary manner with reference to the accompanying drawings, wherein FIG. 1 shows example components of a vehicle;

FIGS. 2 to 5 show example parameters during the exit phase of a sailing mode; and FIGS. 6 to 7 show flow charts of example methods for controlling the drive unit of a vehicle for exiting a sailing mode.

DETAILED DESCRIPTION

FIG. 1 shows example components of a vehicle 100. In particular, FIG. 1 shows a combustion engine 101 that is coupled with a clutch unit 103 via a crankshaft 102. The clutch unit 103 may comprise one or more clutches. The clutch unit 103 may be disengaged or engaged in order to decouple or to couple the crankshaft 102 with a transmission output 105 via a transmission 104, respectively. The crankshaft 102 may be referred to in a more general manner as a driving shaft, and the transmission output 105 may be referred to as an output shaft or a driven shaft. The transmission 104 and the clutch unit 103 may be controlled in an automatic or semi-automatic manner. An example for such automatic or semi-automatic clutch/transmission unit 103, 104 is a dual-clutch transmission (DCT). In case of such automatic or semi-automatic clutch/transmission unit 103, 104, one or more clutches 103 are typically arranged within the transmission 104 in order to allow for shifting between gears and in order to allow for shifting between the different modes N, R and D. Hence, the clutch unit 103 may be part of or may be distributed within the transmission 104.

The clutch/transmission unit 103, 104 may be controlled via a control unit 107. In particular, the control unit 107 may be configured to select a gear of the transmission 104 and/or may be configured to trigger the clutch unit 103 and/or one or more clutches within a combined clutch/transmission unit 103, 104 to engage or to disengage. Furthermore, the engine 101, notably a crankshaft speed or a shaft speed of the engine 101, may be controlled by the control unit 107. The control unit 107 may be configured to control the transmission 104, the clutch unit 103 and/or the engine 101 based on sensor data from one or more vehicle sensors 106. An example for a vehicle sensor 106 is a sensor which is configured to detect an actuation and/or a degree of actuation (e.g. an actuation angle) of a throttle pedal of the vehicle 100.

The vehicle 100 may be operated within a sailing mode. For this purpose, the control unit 107 may cause the clutch unit 103 to disengage such that the driven shaft 105 is decoupled from the engine 101. As a result of this, the crankshaft speed of the engine 101 may be reduced to an idle speed, thereby reducing the consumption of the combustion engine 101. The vehicle 100 may transit into a sailing mode e.g. when the vehicle cruises at a constant speed without actuation of the throttle pedal.

Figure 2:
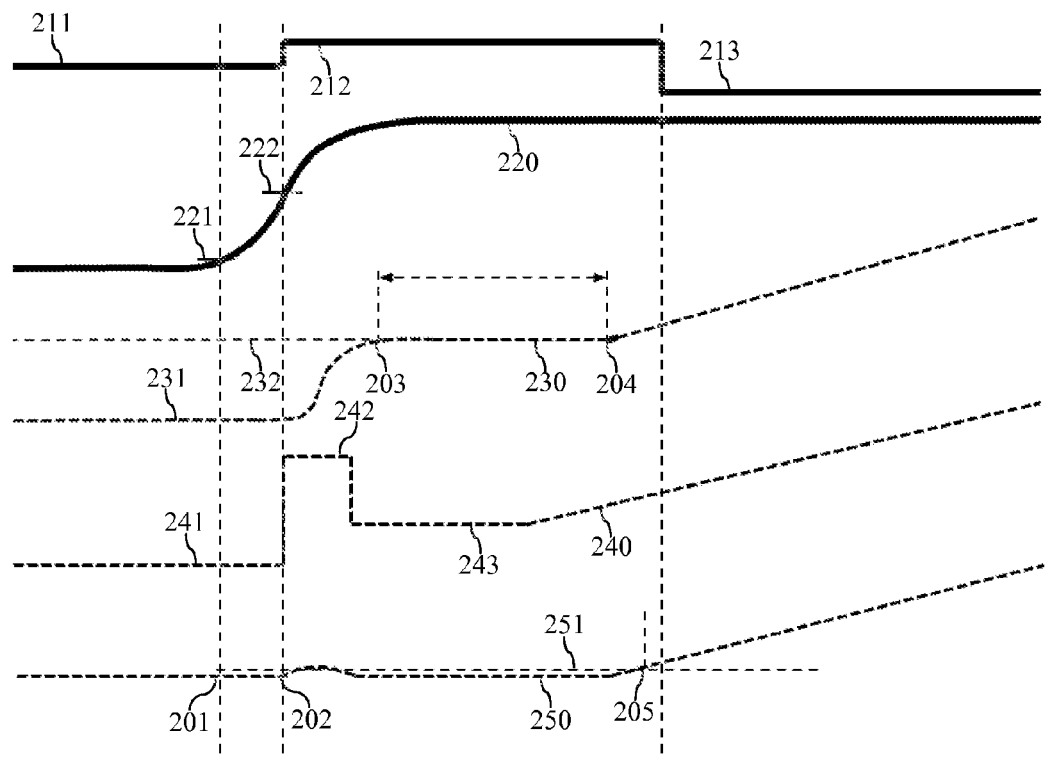

Upon actuation of the throttle pedal, the vehicle 100 may exit the sailing mode. FIG. 2 shows example parameters during the exit phase of the sailing mode. FIG. 2 shows a first phase 211 during which the vehicle 100 is operated in sailing mode. Furthermore, FIG. 2 shows a second phase 212, i.e. the actual exit phase, of the sailing mode. In addition, a third phase 213 is shown during which a re-entry into the sailing mode is allowable.

In the illustrated example, the exit of the sailing mode is initiated by an actuation of the throttle pedal of the vehicle 100. FIG. 2 shows the actuation angle 220 of the throttle pedal as a function of time. At a first time instant 201, the throttle pedal is actuated (corresponding to a first throttle threshold or first throttle angle 221 greater than zero) and at a second time instant 202, the throttle pedal reaches or passes a second throttle threshold or a second throttle angle 222 which marks the entry into the exit phase 212 of the sailing mode. In particular, the fact that the throttle pedal reaches or exceeds the second throttle threshold 222 may be considered to be an exit trigger of the sailing mode.

Upon entry into the exit phase 212, the control unit 107 controls the engine 101 to bring the crankshaft speed 230 up from the idle speed 231 to a target speed 232. The target speed 232 corresponds to the speed for which the crankshaft 102 is in synchronicity with an input shaft of the transmission 104 and/or with the transmission output 105, such that the clutch unit 103 may be engaged in a smooth manner (possibly without slipping).

Furthermore, the clutch unit 103 is prepared for engagement. This is illustrated by the oil pressure 240 within the clutch unit 103. Upon entry into the exit phase 212, the oil pressure 240 is brought up from an idle pressure 241 to a stabilized engagement pressure 243 by passing a momentarily increased filling pressure 242. While the clutch unit 103 is being prepared for engagement, the engine 101 is maintained at the target speed 232 (from time instant 203, when the crankshaft 102 reaches the target speed 232, up to the engagement time instant 204, when the clutch unit 103 is finally and fully engaged).

Only at the engagement time instant 204, the clutch unit 103 is fully engaged and ready to transmit a substantial torque from the engine 101 to the transmission output 105 in order to accelerate the vehicle 100. The resulting acceleration 250 of the vehicle 100 is shown in the lower part of FIG. 2. It can be seen that during the first phase 211 when the vehicle 100 is operated in sailing mode, the acceleration 250 is slightly negative (i.e. the acceleration 250 is below the zero threshold 251 and the vehicle 100 is retarded), and the acceleration 250 exhibits a small bump upon entry into the exit phase 212 (caused by a torque on the crankshaft 102 in order to increase the crankshaft speed 230). However, a substantial positive acceleration 250 is only obtained at the acceleration time instant 205, subsequent to the engagement time instant 204, at which the clutch unit 103 is fully engaged (typically without slipping). As such, a driver of the vehicle 100 experiences a total delay between the first time instant 201, when the driver starts to actuate the throttle pedal, and the acceleration time instant 205, when the vehicle 100 starts to show a substantial positive acceleration 250.

In order to reduce the total delay, the control unit 107 may be configured to predict an exit of the sailing mode based on sensor data of one or more vehicle sensors 106. The exit of the sailing mode may be predicted prior to detection of an actual exit trigger for the sailing mode (which irrevocably and automatically causes a termination of the sailing mode). By way of example, the control unit 107 may predict that a driver of the vehicle 100 wants to exit the sailing mode based on sensor data of a throttle pedal of the vehicle 100. A throttle pedal which reaches or exceeds the second throttle threshold 222 may be a trigger for exiting the sailing mode. Furthermore, a throttle pedal which reaches or exceeds the first throttle threshold 221 (which is smaller than the second throttle threshold 222 and which is reached at the first time instant 201 that occurs prior to the second time instant 202, at which the second throttle threshold 222 is reached) may be used to predict that the trigger for exiting the sailing mode will occur.

Figure 3:
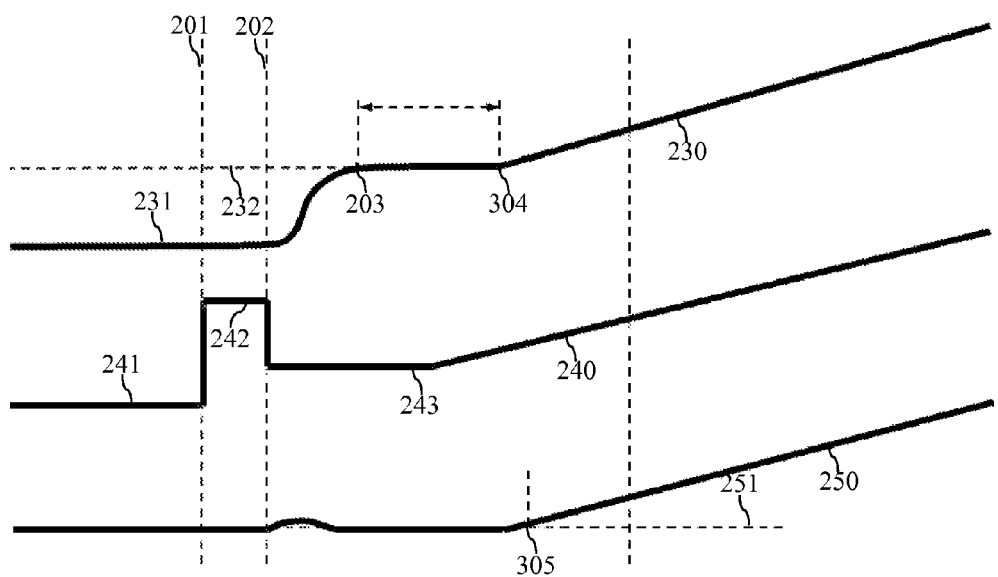

As soon as the control unit 107 predicts that a trigger for exiting the sailing mode will occur, the control unit 107 may start preparing the clutch unit 103 for engagement. This is illustrated in FIG. 3, where the pre-filling of the clutch unit 103 with a liquid for building up the hydraulic pressure 240 is started at the first time instant 201 at which it is predicted that a trigger for exiting the sailing mode will occur. As indicated above, the liquid may be or may comprise oil. By starting the preparation of the clutch unit 103 prior to the detection time instant 202 of the trigger for exiting the sailing mode, the engagement time instant 304 can be brought forward (compared to the engagement time instant 204 of FIG. 2). As a result of this, also the acceleration time instant 305 can be brought forward (compared to the acceleration time instant 205 of FIG. 2). In other words, by starting to prepare the clutch unit 103 for engagement, based on the prediction of an exit trigger for the sailing mode, the delay between the initial actuation of the throttle pedal (at the first time instant 201) and the acceleration time instant 305 can be reduced, thereby reducing the effect of the sailing mode on the driving experience of the driver of the vehicle 100.

It should be noted that the preparation of the clutch unit 103 for engagement may be aborted and/or reverted, if the actual exit trigger does not occur subsequent to predicting that an exit trigger will occur. In particular, the control unit 107 may be configured to measure the time starting from the first time instant 201, when it is predicted that an exit trigger will occur and when the preparation of the clutch unit 103 for engagement is initiated. Furthermore, the control unit 107 may be configured to abort and/or revert the preparation of the clutch unit 103, if the time since the first time instant 201 reaches or exceeds a pre-determined abort time interval (and if no actual exit trigger has occurred during the time interval since the first time instant 201).

It should be noted, that "throttle" is an example sensor signal which is used for easier description, while other sensor signals may be used in an analogous manner. In particular, other or further sensor signals may be used for predicting an exit trigger.

FIG. 4 illustrates a further aspect of the exit phase 212 of the sailing mode. In particular, FIG. 4 illustrates how the engine 101 is brought up to the target speed 232 using a regulator (e.g. a PID (Proportional, Integral, Differential) regulator). The regulator for adapting the crankshaft speed 230 is activated upon detection of the exit trigger (i.e. at the second time instant 202). FIG. 4 shows the regulation target 430 which is set at the second time instant 202 to the target speed 232. Regulation is interrupted or aborted at time instant 404.

At the time instant 404, the crankshaft speed 230 has typically reached the target speed 232. When reaching the target speed 232 the engine 101 is controlled to provide a torque of substantially 0 Nm. This is shown by the engine torque 460, which is at 0 Nm or slightly above 0 Nm (reference numeral 461) when the engine 101 is operated in the sailing mode, which is greater than 0 Nm (reference numeral 462) when the crankshaft speed 230 is regulated to and brought up to the target speed 232, and which drops to 0 Nm (reference numeral 463) when the engine 101 has reached the target speed 232. A torque of 0 Nm is indicated by the dotted line 464. The evolution of the engine torque 460 of FIG. 4 leads to a relative inharmonic evolution of the acceleration 250 of the vehicle 100 within the first phase 211 and the second phase 212. As already indicated above, the vehicle 100 is typically retarded in a slight manner when the vehicle 100 is operated in the sailing mode. The increase of the engine torque 460 upon exit of the sailing mode (at the second time instant 202) leads to a slight acceleration of vehicle 100, and the subsequent drop of the engine torque 460 upon completion of the regulation of the crankshaft speed 230 leads to a slight retardation of the vehicle 100. Then (upon full engagement of the clutch unit 103) the full acceleration of the vehicle 100 occurs. As such, the exit of the sailing mode leads to a noticeable succession of retardation and acceleration phases. Furthermore, the delay for providing the full acceleration at the acceleration time instant 205 is relatively long.

FIG. 5 illustrates an alternative method for adapting the crankshaft speed 230 to the target speed 232. As shown in FIG. 5, the regulation of the crankshaft speed 230 is started at the second time instant 202 (i.e. upon detection of the exit trigger for the sailing mode). However, the regulation of the crankshaft speed 230 is interrupted or aborted prior to reaching the target speed 232 at time instant 504. By way of example, the regulation of the crankshaft speed 230 may be interrupted when the crankshaft speed 230 is a pre-determined number of revolutions per minute (rpm) below the target speed 232 or when the crankshaft speed 230 has reached a pre-determined fraction (e.g. 80% or 90%) of the target speed 232.

At the termination time instant 504 of the regulation 530 of the crankshaft speed 230, the engine torque 460 is still positive. The control unit 107 now limits the engine torque 460 (see reference numeral 563) to the maximum torque which may be transmitted by the clutch unit 103 (prior to full engagement of the clutch unit 103). This maximum torque may depend on and may evolve in accordance to the hydraulic pressure 240 within the clutch unit 103. As such, the exit of the sailing mode may make use a "slipping" of the clutch unit 103 prior to full engagement of the clutch unit 103, in order to maintain the engine torque 460 in a positive region 563, subject to the beginning of the exit phase 212 of the sailing mode.

By maintaining the engine torque 460 in the positive region 563 subsequent to the termination of the regulation 530 of the crankshaft speed 230 at time instant 504, the evolution of the acceleration 250 exhibits an increased harmony. In particular, the exit phase 212 of the sailing mode only comprises acceleration phases and no more retardation phases. Furthermore, the acceleration 250 can be built up more rapidly (see advanced time instant 505), thereby shortening the delay of the exit of the sailing mode. Hence, the noticeable effects of the sailing mode on the driving experience of the driver of the vehicle 100 may be reduced.

FIG. 6 shows a flow chart of an example method 600 for management the exit of a vehicle 100 from the sailing mode. The method 600 may be executed by the control unit 107. The vehicle comprises a clutch unit 103 which is disengaged in order to decouple a driving shaft 102 of the vehicle 100 (e.g. the crankshaft) from the output shaft or driven shaft 105 of the vehicle 100, when the vehicle 100 is operated in the sailing mode. The clutch unit 103 may comprise one or more clutches. Furthermore, the clutch 103 unit may be part of a transmission 104, notably of an automatic or semi-automatic transmission. In other words, the clutch unit 103 and the transmission 104 may form an automatic clutch/transmission unit. As such, the driving shaft 102 may correspond to an input of the automatic transmission 104 and the driven shaft 105 may correspond to an output of the automatic transmission 104.

The method 600 comprises predicting 601 that a trigger for an exit of the sailing mode will occur. In other words, the method 600 may comprises predicting 601 than an exit trigger for the sailing mode will occur. A trigger for the exit of the sailing mode (i.e. an exit trigger) may be predicted based on sensor data from one or more vehicle sensors 106. The one or more vehicle sensors 106 may comprise one or more of: a throttle sensor configured to measure a degree of actuation of a throttle device, notably of a throttle pedal, for accelerating the vehicle 100; a camera configured to capture image data of a driver of the vehicle 100 (e.g. in order to identify an intention of the driver of the vehicle 100); and/or a sensor configured to detect a foot of the driver which is approaching a throttle pedal of the vehicle 100.

As such, predicting 601 that a trigger for the exit of the sailing mode (i.e. the exit trigger) will occur may comprise detecting that a throttle device (e.g. the throttle pedal) of the vehicle 100 is actuated. In particular, predicting 601 that a trigger for the exit of the sailing mode (i.e. predicting an exit trigger) will occur may comprise detecting that the throttle device reaches or exceeds a first throttle threshold 221, wherein the first throttle threshold 221 is smaller than a second throttle threshold 222 used as an actual trigger for the exit of the sailing mode (i.e. used as an actual exit trigger).

The method 600 further comprises initiating 602 the preparation of the clutch unit 103 for engagement, subject to predicting that a trigger for the exit of the sailing mode will occur. In particular, the method 600 may comprises pre-filling 602 the clutch unit 103 with a hydraulic liquid, subject to predicting that a trigger for the exit of the sailing mode will occur. In other words, initiating 602 the preparation of the clutch unit 103 for engagement may comprise inserting a liquid into the clutch unit 103 to build up a hydraulic pressure 240 for engagement of the clutch unit 103. The clutch unit 103 may be prepared for engagement once the hydraulic pressure 240 is stabilized at a pre-determined engagement pressure 243.

The method 600 further comprises detecting 603 a trigger for the exit of the sailing mode, i.e. detecting 603 that an exit trigger occurs. Detecting 603 a trigger for the exit of the sailing mode may comprise detecting that a throttle device (e.g. the throttle pedal) of the vehicle 100 reaches or exceeds the second throttle threshold 222.

Predicting 601 that a trigger for the exit of the sailing mode will occur may occur at a first time instant 201, and detecting 603 a trigger for the exit of the sailing mode may occur at a second time instant 202. Typically, the second time instant 202 is subsequent to the first time instant 201. As such, the preparation of the clutch unit 103 for engagement may be initiated prior to the actual detection of an exit trigger or prior to the actual detection of the occurrence of an exit trigger. By doing this, the time interval for exiting the sailing mode, and the time interval for providing acceleration subsequent to a sailing mode may be reduced, thereby reducing noticeable impacts on the driving experience of a driver of the vehicle 100.

The method 600 may further comprise adapting 604 a shaft speed 230 (e.g. the crankshaft speed) of the driving shaft 102, subject to detecting a trigger for the exit of the sailing mode (i.e. subject to detecting the occurrence of an exit trigger). Adapting 604 the shaft speed 230 may comprise increasing the shaft speed 230 up to a target speed 232. The target speed 232 is typically dependent on a speed of an output shaft 105 (also referred to as the transmission output) of the transmission 104. The target speed 232 may correspond to a speed which allows the driving shaft 102 and an input of the transmission 104 to be in synchronicity upon engagement of the clutch unit 103.

A preparation time for preparing the clutch unit 103 for engagement may be longer than an adaption time for adapting the shaft speed 230 of the driving shaft 102. As such, the time interval between the finalization of the preparation of the clutch unit 103 and the finalization of the adaption of the shaft speed 230 may be reduced, thereby reducing the time interval for exiting the sailing mode and thereby reducing noticeable impacts on the driving experience of a driver of the vehicle 100.

The method 600 may further comprise engaging 605 the clutch unit 103 (e.g. engaging the clutch unit 103 without slipping), subject to preparing the clutch unit 103 for engagement and subject to adapting the shaft speed 130, in order to terminate the exit of the sailing mode. The engagement of the clutch unit 103 may occur progressively, wherein prior to a "full engagement" of the clutch unit 103 (e.g. prior to a completed preparation of the clutch unit 103 and/or prior to a completed adaption of the shaft speed 130) the clutch unit 103 may slip.

The method 600 may comprise determining a time that has passed since the first time instant 201, when it was predicted that a trigger for an exit of the sailing mode will occur and when the preparation of the clutch unit 103 has been initiated. Furthermore, the method 600 may comprise aborting the preparation of the clutch unit 103, if the time that has passed since the first time instant 201 is equal to or exceeds a pre-determined time interval, and if no trigger for the exit of the sailing mode has been detected since the first time instant 201. As such, it may be ensured that the clutch unit 103 does not remain unnecessarily in a prepared status.

As outlined in the context of FIG. 5, adapting 604 the shaft speed 230 of the driving shaft 102 may comprise, during a first adaption phase, regulating the shaft speed 230 of the driving shaft 102 in accordance to the target speed 232. In particular, the target speed 232 may be set as a regulation target during the first adaption phase. At the end of the first adaption phase (e.g. upon reaching a pre-determined speed threshold which is smaller than the target speed 232), the regulation of the shaft speed 230 may be interrupted. In particular, the regulation of the shaft speed 230 may be interrupted prior to reaching the target speed 232 and prior to (e.g. fully) engaging the clutch unit 103. Subsequently, during a second adaption phase, a torque 560 at the driving shaft 102 may be adapted or may be limited in accordance to a torque which is transmissible by the clutch unit 103 prior to (e.g. full) engagement of the clutch unit 103. In particular, the torque 560 at the driving shaft 102 may be kept above a pre-determined torque threshold (greater zero). By doing this, the evolution of the acceleration 250 of the vehicle 100 during the exit phase 212 of the sailing mode may be improved. Furthermore, the delay of an onset of the acceleration 250 may be reduced. Hence, noticeable impacts on the driving experience of a driver of the vehicle 100 may be further reduced.

FIG. 7 shows another method 700 for exiting a sailing mode of a vehicle 100. The method 700 may be executed by the control unit 107 of the vehicle 100. It should be noted that the features of method 600 may be combined with the features of method 700 (and vice versa). As already outlined above, the vehicle 100 comprises a clutch unit 103 which is disengaged in order to decouple a driving shaft 102 (e.g. the crankshaft) of the vehicle 100 from a driven shaft 105 of the vehicle 100, when the vehicle 100 is operated in the sailing mode. As outlined above, the clutch unit 103 may be part of an automatic clutch/transmission unit 103, 104.

The method 700 comprises detecting 701 a trigger for an exit of the sailing mode (i.e. detecting the occurrence of an exit trigger for the sailing mode). As outlined in the context of FIG. 6, the exit trigger may depend on a degree of actuation of a throttle device (also referred to as an acceleration device) of the vehicle 100. The method 700 further comprises, subject to detecting a trigger for the exit of the sailing mode and while preparing the clutch unit 103 for engagement, regulating 702 a shaft speed 230 of the driving shaft 102 in accordance to a target speed 232. In addition, the method 700 comprises interrupting 703 the regulation of the shaft speed 230 prior to reaching the target speed 232 and prior to engaging the clutch unit 103. In particular, the regulation of the shaft speed 230 may be interrupted, when the shaft speed 230 has reached a pre-determined speed threshold, wherein the pre-determined speed threshold is lower than the target speed 232, e.g. wherein the pre-determined speed threshold is a pre-determined fraction of the target speed 232.

In addition, the method 700 comprises, subject to interrupting the regulation of the shaft speed 230 and while preparing the clutch unit 103 for engagement, adapting 704 a torque 560 at the driving shaft 102 in accordance to a torque which is transmissible by the clutch unit 103 prior to engagement of the clutch unit 103. Furthermore, the method 700 may comprise engaging the clutch unit 103 (e.g. engaging the clutch unit 103 without slipping), subject to preparing the clutch unit 103 for engagement, in order to exit the sailing mode.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A method for exiting a sailing mode of a vehicle; wherein a clutch unit of the vehicle is disengaged in order to decouple a driving shaft of the vehicle from a driven shaft of the vehicle, when the vehicle is operated in the sailing mode; the method comprising
predicting that a trigger for an exit of the sailing mode will occur;
initiating the preparation of the clutch unit for engagement, subject to predicting that a trigger for the exit of the sailing mode will occur;
detecting a trigger for the exit of the sailing mode;
adapting a shaft speed of the driving shaft, subject to detecting a trigger for the exit of the sailing mode; and
engaging the clutch unit, subject to preparing the clutch unit for engagement and subject to adapting the shaft speed, in order to exit the sailing mode.

2. The method of claim 1, wherein a trigger for the exit of the sailing mode is predicted based on sensor data from one or more vehicle sensors.

3. The method of claim 2, wherein the one or more vehicle sensors comprise one or more of:
a throttle sensor configured to measure a degree of actuation of a throttle device for accelerating the vehicle; and/or
a camera configured to capture image data of a driver of the vehicle; and/or
a sensor configured to detect a foot of the driver which is approaching a throttle pedal of the vehicle.

4. The method of claim 1, wherein predicting that a trigger for the exit of the sailing mode will occur comprises detecting that a throttle device of the vehicle is actuated.

5. The method of claim 4, wherein predicting that a trigger for the exit of the sailing mode will occur comprises detecting that the throttle device reaches or exceeds a first throttle threshold; wherein the first throttle threshold is smaller than a second throttle threshold used as a trigger for the exit of the sailing mode.

6. The method of claim 1, wherein
predicting that a trigger for the exit of the sailing mode will occur occurs at a first time instant;
detecting a trigger for the exit of the sailing mode occurs at a second time instant; and
the second time instant is subsequent to the first time instant.

7. The method of claim 1, wherein initiating the preparation of the clutch unit for engagement comprises inserting a liquid into the clutch unit to build up a hydraulic pressure for engagement of the clutch unit; wherein the clutch unit is prepared for engagement once the hydraulic pressure is stabilized at an engagement pressure.

8. The method of claim 1, wherein detecting a trigger for the exit of the sailing mode comprises detecting that a throttle device of the vehicle reaches or exceeds a second throttle threshold.

9. The method of claim 1, wherein a preparation time for preparing the clutch unit for engagement is longer than an adaption time for adapting the shaft speed of the driving shaft.

10. The method of claim 1, wherein adapting the shaft speed comprises increasing the shaft speed up to a target speed; wherein the target speed is dependent on a speed of the driven shaft.

11. The method of claim 1, further comprising
determining a time that has passed since a first time instant when it was predicted that a trigger for an exit of the sailing mode will occur; and
aborting the preparation of the clutch unit, if the time that has passed since the first time instant is equal to or exceeds a pre-determined time interval, and if no trigger for the exit of the sailing mode has been detected since the first time instant.

12. The method of claim 1, wherein the clutch unit and a transmission of the vehicle form an automatic clutch/transmission unit.

13. The method of claim 1, wherein adapting the shaft speed of the driving shaft comprises
during a first adaption phase, regulating the shaft speed of the driving shaft in accordance to a target speed;
interrupting the regulation of the shaft speed prior to reaching the target speed and prior to engaging the clutch unit; and
subsequently, during a second adaption phase, adapting a torque at the driving shaft in accordance to a torque which is transmissible by the clutch unit prior to engagement of the clutch unit.

14. A control unit for a vehicle; wherein the vehicle comprises a clutch unit which is disengaged, when the vehicle is operated in a sailing mode, in order to decouple a driving shaft of the vehicle from a driven shaft of the vehicle; wherein the control unit is configured to
- predict that a trigger for an exit of the sailing mode will occur;
- initiate the preparation of the clutch unit for engagement, subject to predicting that a trigger for the exit of the sailing mode will occur;
- detect a trigger for the exit of the sailing mode;
- cause a shaft speed of the driving shaft to be adapted, subject to detecting a trigger for the exit of the sailing mode; and
- cause the clutch unit to be engaged, subject to preparing the clutch unit for engagement and subject to adapting the shaft speed, in order to exit the sailing mode.

* * * * *